United States Patent
Martin et al.

(10) Patent No.: US 11,098,964 B1
(45) Date of Patent: Aug. 24, 2021

(54) MODULAR PIPING MANIFOLD SYSTEM FOR HEAT EXCHANGERS

(71) Applicant: Hudson Products Corporation, Ball Ground, GA (US)

(72) Inventors: Indian Martin, Tulsa, OK (US); Chad Martin, Owasso, OK (US); Ron Kuegler, Broken Arrow, OK (US); Scott Williams, Edmond, OK (US)

(73) Assignee: Hudson Products Corporation, Ball Ground, GA (US)

( * ) Notice: Subject to any disclaimer, the term of this patent is extended or adjusted under 35 U.S.C. 154(b) by 104 days.

(21) Appl. No.: 16/398,882

(22) Filed: Apr. 30, 2019

Related U.S. Application Data

(60) Provisional application No. 62/664,934, filed on Apr. 30, 2018.

(51) Int. Cl.
*F28F 9/013* (2006.01)
*F16L 3/227* (2006.01)
*F16L 3/22* (2006.01)
*F28D 7/00* (2006.01)

(52) U.S. Cl.
CPC ............ *F28F 9/0131* (2013.01); *F16L 3/221* (2013.01); *F16L 3/227* (2013.01); *F28D 7/005* (2013.01); *F28F 2280/00* (2013.01)

(58) Field of Classification Search
CPC . F16L 3/085; F16L 3/10; F16L 3/1226; F16L 3/22; F16L 3/221; F16L 3/222; F16L 3/223; F16L 3/227; F28D 1/05308; F28D 1/05358; F28D 7/005; F28F 9/0131; F28F 9/246; F28F 9/26; F28F 9/262; F28F 2280/00; F28F 2280/06

USPC ................................................. 165/143, 144
See application file for complete search history.

(56) References Cited

U.S. PATENT DOCUMENTS

| | | | | |
|---|---|---|---|---|
| 2,401,918 A | * | 6/1946 | Elder ...................... | F28B 1/06 165/122 |
| 2,417,260 A | * | 3/1947 | Morehouse ............. | F16L 3/227 174/135 |
| 2,938,712 A | * | 5/1960 | Pellmyr .................. | F23M 20/00 165/137 |
| 3,592,427 A | * | 7/1971 | Misuraca ................ | F16L 3/227 248/68.1 |
| 4,905,943 A | * | 3/1990 | Sugiyama ................ | F16L 3/22 248/68.1 |

(Continued)

*Primary Examiner* — Eric S Ruppert
*Assistant Examiner* — Hans R Weiland
(74) *Attorney, Agent, or Firm* — Cook Alex Ltd.; R. Blake Johnston

(57) ABSTRACT

An air-cooled heat exchanger is connectable between an upstream fluid source and a downstream fluid destination by a plurality of external pipes having connection ends arranged in one or more external pipe connection configurations. The air-cooled heat exchanger has a cooling tubes assembly that includes a plurality of headers, a plurality of intermediate pipes connected to the plurality of headers, and a modular manifold system that connects the plurality of intermediate pipes to the plurality of external pipes. The modular manifold system includes a plurality of pipe elbows each connected to a corresponding one of the plurality of intermediate pipes, and one or more trays. Each of the plurality of pipe elbows is retained within the one or more trays in a configuration that matches the one or more external pipe connection configurations.

20 Claims, 4 Drawing Sheets

(56) References Cited

U.S. PATENT DOCUMENTS

| | | | | |
|---|---|---|---|---|
| 6,250,591 | B1* | 6/2001 | Cunningham | F16L 3/2235 248/65 |
| 6,561,466 | B1* | 5/2003 | Myers | F16L 3/221 248/68.1 |
| 2004/0074100 | A1* | 4/2004 | Polk, Jr. | F24F 1/34 33/562 |
| 2006/0272243 | A1* | 12/2006 | Carew | H02G 3/383 52/220.1 |
| 2009/0045301 | A1* | 2/2009 | Collins | F16L 3/1226 248/74.1 |
| 2009/0211295 | A1* | 8/2009 | Cavagne | F25J 3/0295 62/617 |
| 2010/0258687 | A1* | 10/2010 | Celikkol | F16L 55/035 248/74.4 |
| 2011/0139423 | A1* | 6/2011 | Troutman | F28F 9/262 165/173 |
| 2013/0312455 | A1* | 11/2013 | Jeon | F28F 9/26 62/525 |
| 2014/0191092 | A1* | 7/2014 | Nakamura | E02F 3/302 248/68.1 |
| 2015/0129725 | A1* | 5/2015 | Zedan | H02G 3/32 248/67.5 |
| 2018/0023732 | A1* | 1/2018 | Pistone | F16L 37/1225 285/325 |
| 2020/0189349 | A1* | 6/2020 | Sakaguchi | B60H 1/00571 |

\* cited by examiner

MODULAR PIPING MANIFOLD SYSTEM FOR HEAT EXCHANGERS

RELATED APPLICATIONS

The present application claims the benefit of U.S. Provisional Patent Application Ser. No. 62/664,934 filed Apr. 30, 2018 entitled "Modular Piping Manifold System for Heat Exchangers," the entire disclosure of which is herein incorporated by reference thereto.

FIELD OF THE INVENTION

The present invention generally relates to heat exchangers, and more particularly, but not by way of limitation, to standardized system for connecting process fluid conduits to an air-cooled heat exchanger.

BACKGROUND OF THE INVENTION

Air-cooled heat exchangers are used in a wide variety of industrial applications. A process fluid, either a gas or a liquid, is passed through a series of cooling tubes while air is mechanically passed over the exterior of the cooling tubes. The air absorbs heat from the cooling tubes, thereby lowering the temperature of the fluid within the tubes. The cooling tubes may include lateral or axial fins to aid in heat transfer. In most designs, the cooling tubes extend between boxed headers situated on opposite sides of the air cooled heat exchanger. The boxed headers serve as manifolds that provide a connection point to upstream and downstream piping for the process fluid entering and leaving the air cooled heat exchanger. The inlet and discharge piping may be connected to the boxed headers on one or both sides of the air cooled heat exchanger.

Air cooled heat exchangers often include a large fan that forces or draws air at ambient conditions through a plenum fabricated from a series of panels supported by an underlying frame assembly. The fan is typically connected to a shaft, which is driven by an external engine. The fan shaft is supported by durable bearings that reduce friction and provide axial and radial support to the fan and fan shaft.

The plenum directs the ambient air through the cooling tubes, which are often connected between header boxes located on opposite sides of the plenum. The header boxes further include an inlet or an outlet to permit the flow of the process fluid through the heat exchanger. In some applications, a series of adjustable louvres are positioned upstream from the cooling tubes to control the flow of air across the cooling tubes. The louvers may be pneumatically, hydraulically or electrically powered.

As illustrated in the PRIOR ART depiction of the air cooled heat exchanger 200 depicted in FIG. 1, during installation of the air cooled heat exchanger 200, a series of independent pipes 202 are connected to the boxed header 204 to deliver the process fluid to the air cooled heat exchanger 200. In most cases, the air cooled heat exchanger 200 is shipped to the installation site on a skid or other support, without pipes 202 connected to the header 204. Once the air cooled heat exchanger 200 has been properly located at the installation site, the installers make the necessary piping connections between upstream and downstream facilities and the boxed headers 204.

Although widely adopted, this method of connecting to the air cooled heat exchanger 200 presents several challenges. In particular, design engineers must wait until the air cooled heat exchanger 200 is located in its operational position before a piping solution is developed. Additionally, the use of custom-routed lines to and from the boxed headers on the air cooled heat exchanger 200 increase fabrication time, complexity and expense. This may cause construction and installation delays, and produce inefficient piping solutions. The presently preferred embodiments are directed to these and other deficiencies in the prior art.

SUMMARY OF THE INVENTION

In one aspect, the exemplary embodiments provide an air-cooled heat exchanger connectable between an upstream fluid source and a downstream fluid destination by a plurality of external pipes having connection ends arranged in one or more external pipe connection configurations. The air-cooled heat exchanger has a plenum, a plurality of boxed headers, a cooling tubes assembly extending through the plenum, a plurality of intermediate pipes connected to each of the plurality of boxed headers and a modular manifold. The modular manifold includes a tray, a first flanged pipe elbow connected to one of the plurality of intermediate pipes and supported by the tray, and a second flanged pipe elbow connected between one of the plurality of intermediate pipes and supported by the tray. The first flanged pipe elbow and the second flanged pipe elbow are oriented in the tray in a configuration that matches the connection configuration of a corresponding one of the plurality of external pipes.

Another embodiment includes an air-cooled heat exchanger connectable between an upstream fluid source and a downstream fluid destination by a plurality of external pipes having connection ends arranged in one or more external pipe connection configurations, where the air-cooled heat exchanger has a cooling tubes assembly that includes a plurality of headers, a plurality of intermediate pipes connected to the plurality of headers, and a modular manifold system that connects the plurality of intermediate pipes to the plurality of external pipes. The modular manifold system includes a plurality of pipe elbows each connected to a corresponding one of the plurality of intermediate pipes, and one or more trays. Each of the plurality of pipe elbows is retained within the one or more trays in a configuration that matches the one or more external pipe connection configurations.

In yet another embodiment, an air-cooled heat exchanger is connectable between an upstream fluid source and a downstream fluid destination by a plurality of external pipes having connection ends arranged in one or more external pipe connection configurations. In this embodiment, the air-cooled heat exchanger includes a plenum, a cooling tubes assembly that includes a plurality of headers, a fan assembly configured to move air through the plenum and the cooling tubes assembly, a plurality of intermediate pipes connected to the plurality of headers, and a modular manifold system that connects the plurality of intermediate pipes to the plurality of external pipes. The modular manifold system includes a plurality of pipe elbows and one or more trays connected to the plenum. Each of the plurality of pipe elbows is connected to a corresponding one of the plurality of intermediate pipes and each of the plurality of pipe elbows is retained within the one or more trays in a configuration that matches the one or more external pipe connection configurations.

WRITTEN DESCRIPTION

Figure 1:
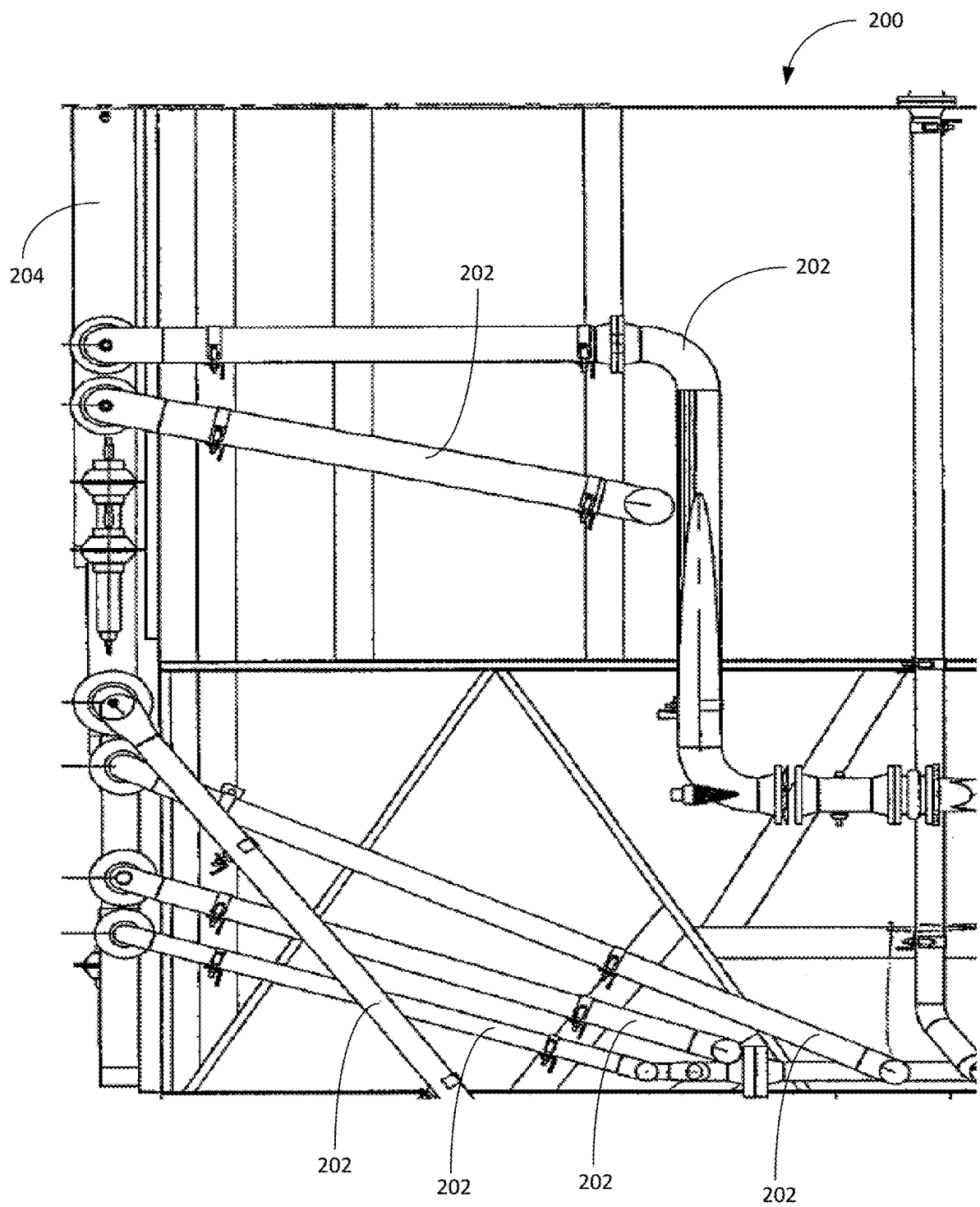
FIG. 1 is a side view of a PRIOR ART air cooled heat exchanger with a conventional connection to the boxed header.
Figure 2:
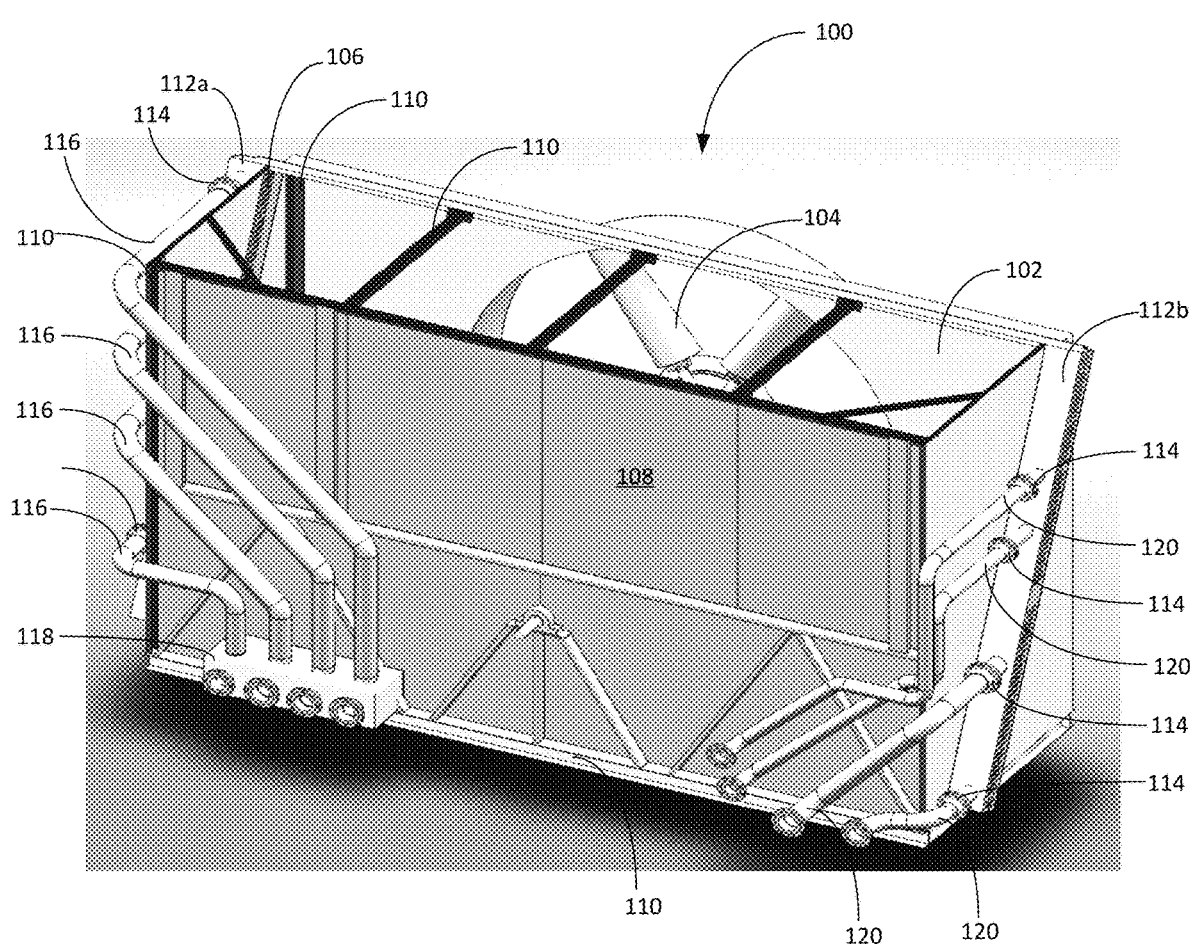
FIG. 2 is a perspective view of an air cooled heat exchanger with a conventional connection and a modular manifold connection constructed on accordance with an exemplary embodiment.
Figure 3:
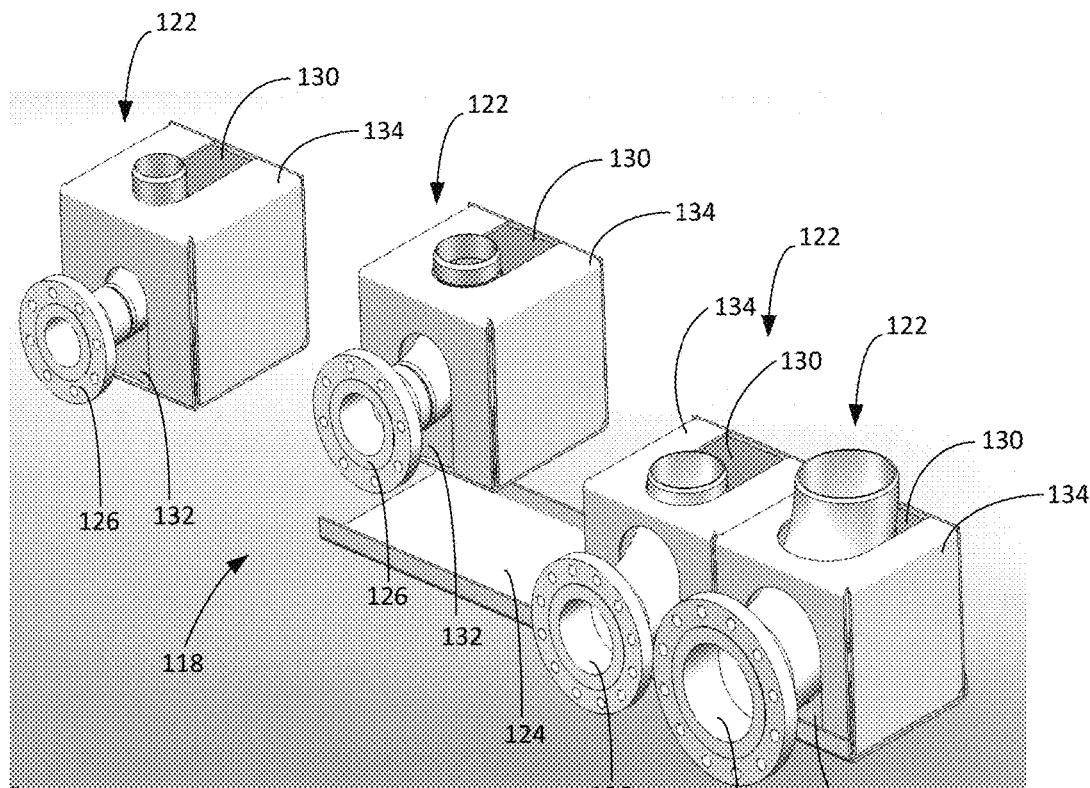
FIG. 3 is a perspective view of the modular manifold of FIG. 2 showing the placement of independent elbow supports in the manifold tray.
Figure 4:
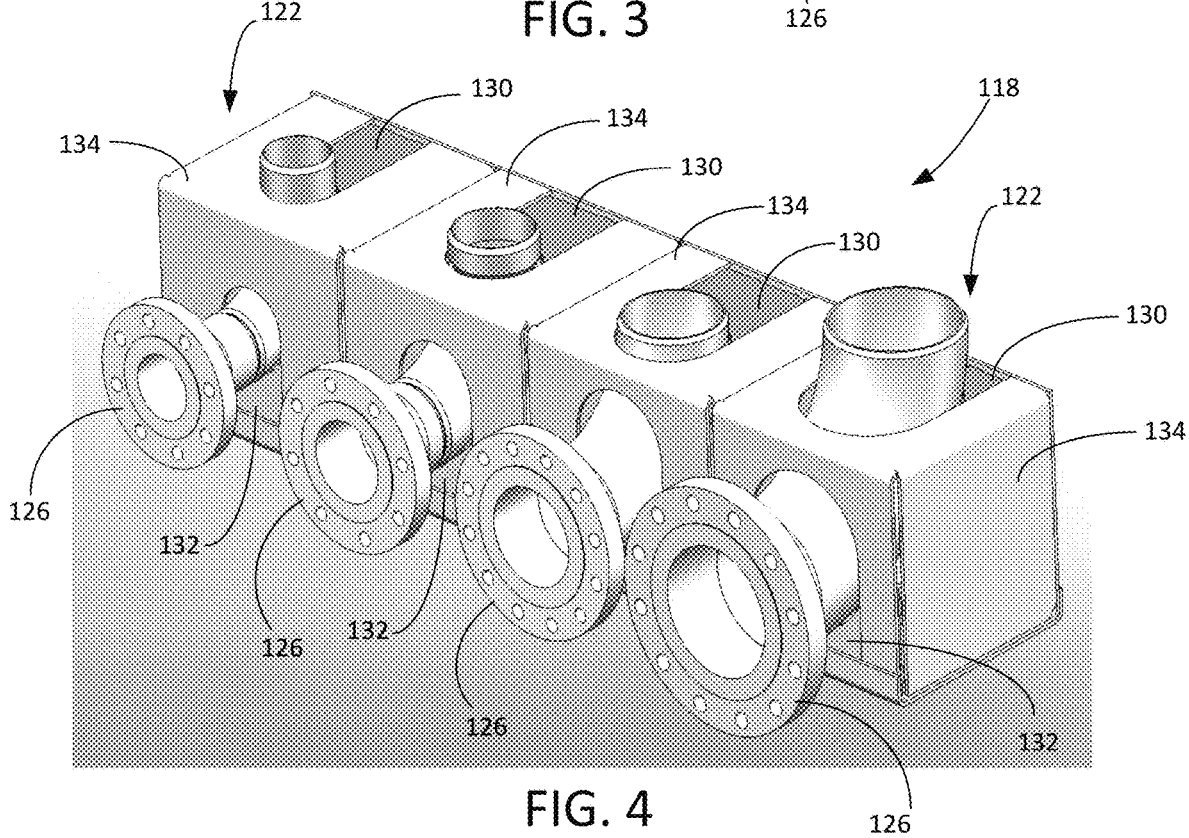
FIG. 4 is a perspective view of the modular manifold of FIG. 2 showing the assembled elbow supports in the manifold tray.

Referring to FIG. 2, shown therein is a rear, perspective view of an air cooled heat exchanger 100 constructed in accordance with an exemplary embodiment. The air cooled heat exchanger 100 generally includes a plenum 102, a fan assembly 104, and cooling tubes assembly 106. As depicted in FIG. 2, the air cooled heat exchanger 100 is configured as a forced-draft unit in which ambient air is forced by the fan assembly 104 into the front of the plenum 102, through the cooling tubes assembly 106, and out the top of the plenum 102. In alternate embodiments, the air cooled heat exchanger 100 is an induced draft air design in which air is drawn across the cooling tubes assembly 106.

The plenum 102 includes a series of panels 108 that are attached to a frame assembly 110. The panels 108 and frame assembly 110 are preferably constructed from metal or other durable materials. The frame assembly 110 may include a base constructed from "I-beams" and a structural skeleton that includes a plurality of trusses, struts and beams (not separately designated).

The cooling tubes assembly 106 includes a plurality of cooling tubes (not shown) extending between a pair of boxed headers 112a, 112b. The cooling tubes may include fins or other structures that increase the exchange of heat between the cooling tubes and air passing over the cooling tubes. The boxed headers 112a, 112b are preferably configured as pressure vessels with connection flanges 114 configured for connection to inlet and discharge piping.

The boxed header 112a is connected through a series of intermediate pipes 116 to a modular manifold 118 constructed in accordance with an exemplary embodiment. In contrast, the boxed header 112b is connected to upstream or downstream process piping (not shown) through conventional, custom-routed lines 120 that are fabricated and placed once the air cooled heat exchanger 100 has been installed. It will be understood that the depiction of the custom-routed lines 120 is meant only to demonstrate contrast with the intermediate pipes 116 and modular manifold 118.

In exemplary embodiments, the air cooled heat exchanger 100 has a pair of modular manifolds 118, each connected to a corresponding one of the boxed headers 112a, 112b with intermediate pipes 116. The modular manifolds 118 are configured to facilitate the connection of the intermediate pipes 116 to external pipes running to upstream fluid sources and downstream fluid destinations. The modular manifolds 118 can be arranged to match the configurations of the connection ends of the external piping to be connected to the air-cooled heat exchanger 100.

Turning to FIGS. 3-6, shown therein are perspective and exploded views of the modular manifold 118. The modular manifold 118 includes one or more elbow supports 122 that are configured to be supported by a tray 124. Each of the elbow supports 122 is configured to support a flanged pipe elbow 126. The flanged end of the flanged pipe elbow 126 is configured to be fastened to inlet or discharge piping to the air cooled heat exchanger 100. The opposite end of the flanged pipe elbow 126 is configured to be welded to one of the intermediate pipes 116.

In preferred embodiments, each of the elbow supports 122 is configured to position the open end of the flanged pipe elbow 126 along a common centerline, to further facilitate the routing of upstream and downstream process piping. Although the modular manifold 118 is shown in a horizontal, linear configuration, it will be appreciated that in alternate embodiments the modular manifold 118 is configured such that the individual modular elbow supports 122 are aligned in a vertical, linear configuration, or in a stacked configuration that includes at least two rows or two columns of elbow supports 122.

Figure 5:
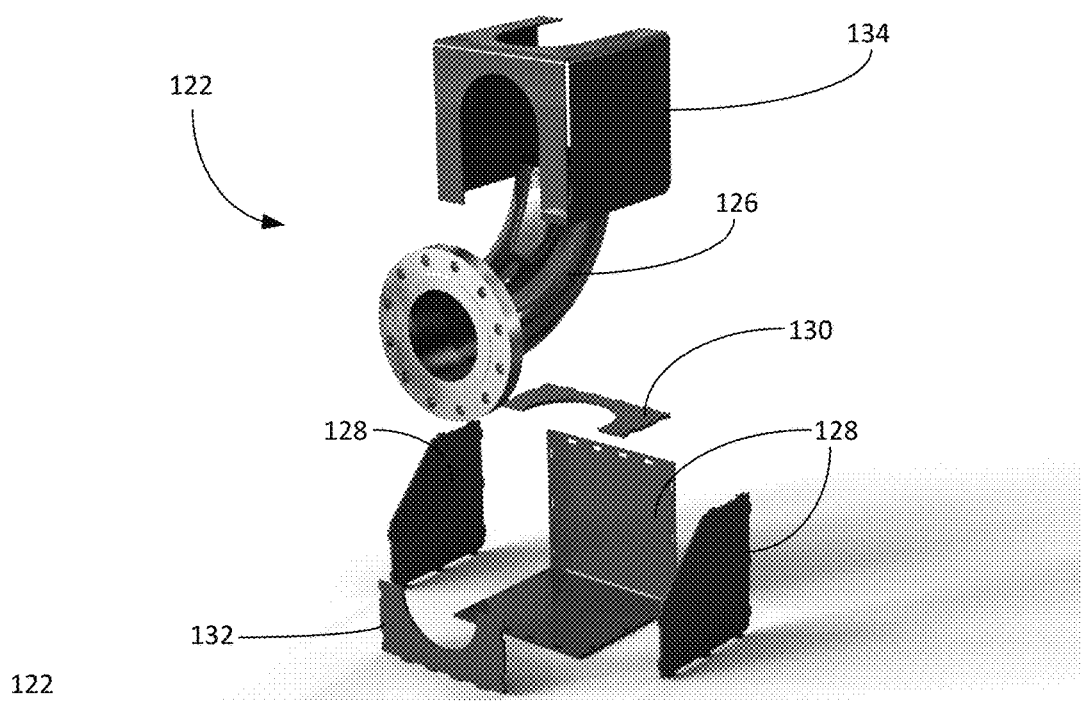
FIG. 5 is a perspective, exploded view of an elbow support.
Figure 6:
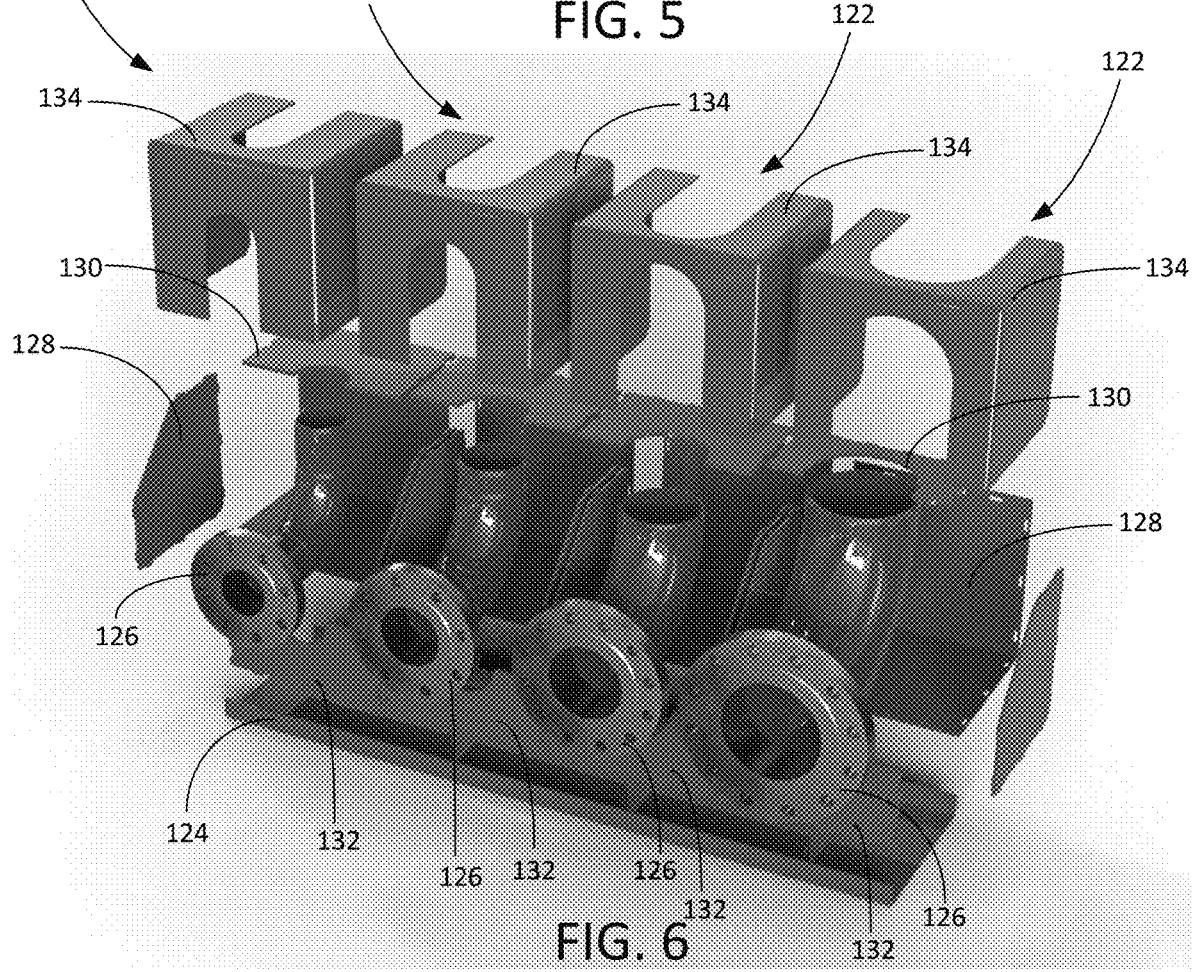
FIG. 6 is a perspective, exploded view of the modular manifold.

As depicted in FIGS. 5-6, each elbow support 122 includes a box bracket 128 that includes a base, back and side walls (not separately designated). To support the flanged pipe elbow 126, the elbow support 122 includes an upper saddle 130 and lower saddle 132 to cradle the flanged pipe elbow 126. The upper and lower saddles 130, 132 are sized and configured to support a variety of flanged pipe elbows 126 at a desired position within the modular manifold 118.

In exemplary embodiments, the box bracket 128, upper saddle 130 and lower saddle 132 are manufactured with mating tabs and slots that facilitate the assembly of these components. After these components have been properly assembled using the tabs and slots, the box bracket 128 and upper and lower saddles 130, 132 can be welded together and to the flanged pipe elbow 126. A cover 134 can be placed over the top of the pipe elbow 126 to prevent debris from accumulating inside the elbow support 122. In some embodiments, the cover 134 is secured to the elbow support 112 with machine screws, latches, magnets or other releasable fastening mechanisms. The elbow supports 122 can be welded to the tray 124, which in turn can be secured to the frame assembly 110 of the air cooled heat exchanger 100.

The modular manifold 118 serves as a fixed reference point for connection of upstream and downstream process piping to the air cooled heat exchanger 100. Process engineers can provide piping requirements to the heat exchanger manufacturer before the air cooled heat exchanger 100 is manufactured. For example, the customer's engineering team can supply the manufacturer with pressure requirements, temperature demands, number of process fluid inlets, number of process fluid discharges, pipe schedule, pipe material, process fluid compositions and desired placement of the process connections to the air cooled heat exchanger 100. The manufacturer can then configure the modular manifold 118 to accommodate these requests before the air cooled heat exchanger 100 is shipped to its place of operation. This reduces the amount of fabrication and design that must take place in a variable environment while the air cooled heat exchanger 100 is being installed.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be at least ±20%, or at least ±10%, or at least ±5% of the base value.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein and within the appended claims. It will be appreciated by those skilled in the art that the teachings of the present invention can be applied to other systems without departing from the scope and spirit of the present invention.

What is claimed is:

1. An air-cooled heat exchanger connectable between an upstream fluid source and a downstream fluid destination by a plurality of external pipes having connection ends arranged in one or more external pipe connection configurations, the air-cooled heat exchanger comprising:
    a plenum;
    a plurality of boxed headers;
    a cooling tubes assembly extending through the plenum;
    a plurality of intermediate pipes connected to each of the plurality of boxed headers;
    a modular manifold, wherein the modular manifold comprises:
        a tray;
        a first flanged pipe elbow connected to one of the plurality of intermediate pipes, wherein the first flanged pipe elbow is supported by a first elbow support that is supported by the tray;
        a second flanged pipe elbow connected between one of the plurality of intermediate pipes, wherein the second flanged pipe elbow is supported by a second elbow support that is supported by the tray; and
        wherein the first flanged pipe elbow and the second flanged pipe elbow are oriented in the tray in a configuration that matches the connection configuration of a corresponding one of the plurality of external pipes and along a common centerline of an open end of each of the first and second flanged pipe elbows.

2. The air-cooled heat exchanger of claim 1, further comprising a plurality of modular manifolds.

3. The air-cooled heat exchanger of claim 1, wherein the first elbow support of the modular manifold further comprises:
    a first box bracket configured to be secured within the tray;
    a first upper saddle connected to the first box bracket, wherein the first upper saddle is configured to support an upper end of the first flanged pipe elbow; and
    a first lower saddle connected to the first box bracket, wherein the first lower saddle is configured to support a lower end of the first flanged pipe elbow.

4. The air-cooled heat exchanger of claim 3, wherein the first elbow support of the modular manifold further comprises a first cover connected to the first box bracket over the first flanged pipe elbow.

5. The air-cooled heat exchanger of claim 3, wherein the second elbow support of the modular manifold further comprises:
    a second box bracket configured to be secured within the tray;
    a second upper saddle connected to the second box bracket, wherein the second upper saddle is configured to support an upper end of the second flanged pipe elbow; and
    a second lower saddle connected to the second box bracket, wherein the second lower saddle is configured to support a lower end of the second flanged pipe elbow.

6. The air-cooled heat exchanger of claim 5, wherein the second elbow support of the modular manifold further comprises a second cover connected to the second box bracket.

7. The air-cooled heat exchanger of claim 6, wherein each of the first and second flanged pipe elbows is welded to the each of the corresponding first and second box brackets and wherein the first and second box brackets are welded to the tray.

8. The air-cooled heat exchanger of claim 1, wherein the tray is secured to the plenum.

9. The air-cooled heat exchanger of claim 1, further comprising a plurality of custom-routed lines connected between one or more of the plurality of boxed headers and corresponding ones of the plurality of external pipes which are fabricated and placed after the exchanger is in place.

10. An air-cooled heat exchanger connectable between an upstream fluid source and a downstream fluid destination by a plurality of external pipes having connection ends arranged in one or more external pipe connection configurations, the air-cooled heat exchanger comprising:
    a cooling tubes assembly that includes a plurality of headers;
    a plurality of intermediate pipes connected to the plurality of headers; and
    a modular manifold system that connects the plurality of intermediate pipes to the plurality of external pipes, wherein the modular manifold system comprises:
        a plurality of pipe elbows, wherein each of the plurality of pipe elbows is connected to a corresponding one of the plurality of intermediate pipes;
        a plurality of elbow supports, each elbow support supporting a pipe elbow; and one or more trays, wherein each of the plurality of pipe elbows and elbow supports is retained within the one or more trays in a configuration that matches the one or more external pipe connection configurations and along a common centerline of an open end of each of the plurality of pipe elbows.

11. The air-cooled heat exchanger of claim 10, wherein the elbow supports of the modular manifold system further comprises a plurality of box brackets configured to be secured within the one or more trays, wherein each of the plurality of box brackets is configured to receive a corresponding one of the plurality of pipe elbows.

12. The air-cooled heat exchanger of claim 11, wherein the elbow supports of the modular manifold system further comprises a plurality of upper saddles, wherein each of the plurality of upper saddles is connected to a corresponding one of the plurality of box brackets and wherein each of the plurality of upper saddles is sized to receive a corresponding one of the plurality of pipe elbows.

13. The air-cooled heat exchanger of claim 11, wherein the elbow supports of the modular manifold system further comprises a plurality of lower saddles, wherein each of the plurality of lower saddles is connected to a corresponding one of the plurality of box brackets and wherein each of the plurality of lower saddles is sized to receive a corresponding one of the plurality of pipe elbows.

14. The air-cooled heat exchanger of claim 13, wherein the elbow supports of the modular manifold system further comprises a plurality of covers, wherein each of the plurality of covers is connected to a corresponding one or more of the plurality box brackets.

15. The air-cooled heat exchanger of claim 10, wherein at least three of the plurality of pipe elbows are retained within the one or more trays in a horizontal linear arrangement.

16. The air-cooled heat exchanger of claim 10, wherein at least three of the plurality of pipe elbows are retained within the one or more trays in a vertical linear arrangement.

17. The air-cooled heat exchanger of claim 10, wherein at least three of the plurality of pipe elbows are retained within the one or more trays in a stacked arrangement.

18. The air-cooled heat exchanger of claim 10, wherein at least three of the plurality of pipe elbows are retained within the one or more trays in a linear arrangement.

19. An air-cooled heat exchanger connectable between an upstream fluid source and a downstream fluid destination by a plurality of external pipes having connection ends arranged in one or more external pipe connection configurations, the air-cooled heat exchanger comprising:
   a plenum;
   a cooling tubes assembly that includes a plurality of headers;
   a fan assembly configured to move air through the plenum and the cooling tubes assembly;
   a plurality of intermediate pipes connected to the plurality of headers; and
   a modular manifold system that connects the plurality of intermediate pipes to the plurality of external pipes, wherein the modular manifold system comprises:
      a plurality of pipe elbows, wherein each of the plurality of pipe elbows is connected to a corresponding one of the plurality of intermediate pipes;
      a plurality of elbow supports, each elbow support supporting a pipe elbow; and
      one or more trays connected to the plenum, wherein each of the plurality of pipe elbows and elbow supports is retained within the one or more trays in a configuration that matches the one or more external pipe connection configurations and along a common centerline of an open end of each of the plurality of pipe elbows.

20. The air-cooled heat exchanger of claim 19, wherein a first number of the plurality of pipe elbows is retained within a corresponding one of the one or more trays in a configuration selected from the group consisting of horizontal linear, vertical linear and stacked configurations.

* * * * *